United States Patent
Chae et al.

(10) Patent No.: US 7,801,237 B2
(45) Date of Patent: Sep. 21, 2010

(54) APPARATUS AND METHOD OF SPACE TIME FREQUENCY BLOCK CODE

(75) Inventors: Chan-Byoung Chae, Seoul (KR); Hong-Sil Jeong, Seoul (KR); Sung-Ryul Yun, Suwon-si (KR); Won-Il Roh, Yongin-si (KR); Jeong-Tae Oh, Yongin-si (KR); Kyun-Byoung Ko, Hwasung-si (KR); Young-Ho Jung, Seoul (KR); Seung-Hoon Nam, Seoul (KR); Jae-Hak Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 663 days.

(21) Appl. No.: 11/665,888

(22) PCT Filed: Nov. 4, 2005

(86) PCT No.: PCT/KR2005/003728
§ 371 (c)(1),
(2), (4) Date: Apr. 19, 2007

(87) PCT Pub. No.: WO2006/049461
PCT Pub. Date: May 11, 2006

(65) Prior Publication Data
US 2008/0113632 A1    May 15, 2008

(30) Foreign Application Priority Data

Nov. 4, 2004  (KR) ............... 10-2004-0089444
Nov. 16, 2004 (KR) ............... 10-2004-0093704

(51) Int. Cl.
*H04B 7/02* (2006.01)
*H04L 1/02* (2006.01)
*H04B 7/08* (2006.01)

(52) U.S. Cl. ............... 375/267; 375/260; 455/132

(58) Field of Classification Search ............... 375/260, 375/267
See application file for complete search history.

(56) References Cited

U.S. PATENT DOCUMENTS 6,101,223 A * 8/2000 Betts .................. 375/261

(Continued)

FOREIGN PATENT DOCUMENTS

JP       2004215255         7/2004

(Continued)

OTHER PUBLICATIONS

Alamouti, A Simple Transmit Diversity Technique for Wireless Communications, IEEE Journal on Select Areas in Communications, vol. 16, No. 8, Oct. 1998.

(Continued)

*Primary Examiner*—David C Payne
*Assistant Examiner*—Erin M File
(74) *Attorney, Agent, or Firm*—The Farrell Law Firm, LLP (57) ABSTRACT

The present invention relates to a transmitter and a transmission method in communication system using three Tx antennas in order to maximize STFBC coding gain. An input symbol sequence is transmitted through a plurality of Tx antennas in a predetermined method.

12 Claims, 4 Drawing Sheets

U.S. PATENT DOCUMENTS

2006/0039495 A1* 2/2006 Chae et al. .................. 375/267
2006/0039499 A1* 2/2006 Chae et al. .................. 375/299
2007/0140105 A1* 6/2007 Coon ......................... 370/208

FOREIGN PATENT DOCUMENTS

WO      WO 03/043245      5/2003

OTHER PUBLICATIONS

Tarokh et al., Space-Time Block Codes From Orthogonal Designs, IEEE Transactions on Information Theory, vol. 45, No. 5, Jul. 1999.
Li et al., STFBC Method for the ICI Reduction in OFDM Communication System, $10^{th}$ Asia-Pacific Conference on Communications and $5^{th}$ International Symposium on Multi-Dimensional Mobile Communications, 2004.
Wei et al., Space-Time-Frequency Block Coding Over Rayleigh Fading Channels for OFDM Systems, Proceedings of ICCT2003.

* cited by examiner

APPARATUS AND METHOD OF SPACE TIME FREQUENCY BLOCK CODE

TECHNICAL FIELD

The present invention relates generally to a transmit (Tx) antenna diversity apparatus and a method in a mobile communication system, and in particular, to a transmitter and a transmission method in a mobile communication system using multiple antennas in order to maximize a coding gain.

BACKGROUND ART

A fundamental issue in communications is the efficiency and reliability with which data is transmitted on channels. As future-generation multimedia mobile communications require high-speed communication systems capable of transmitting a variety of information including video and wireless data beyond the voice-focused service, it is very significant to increase system efficiency by using a channel coding method suitable for a system.

Generally, a transmission signal in a wireless channel environment of a mobile communication system inevitably experiences loss due to several factors such as multipath interference, shadowing, wave attenuation, time-variant noise, and fading. The information loss causes a severe distortion to the transmission signal, degrading an entire system performance. In order to reduce the information loss, many error control techniques are usually utilized to increase system reliability. A basic error control technique is to use an error correction code.

Additionally, multipath fading is relieved by diversity techniques in the wireless communication system. The diversity techniques are time diversity, frequency diversity, and antenna diversity.

Antenna diversity uses multiple antenna and is further branched into receive (Rx) antenna diversity using a plurality of Rx antenna diversity using a plurality of Rx antennas, Tx antenna diversity using a plurality if Tx antennas, and multiple-input multiple-output (MIMO) using a plurality of Tx antennas and a plurality of Rx antennas.

MIMO is a special case of space-time coding (STC) that extends coding of the time domain to the space domain by transmission of a signal encoded in a predetermined coding method through a plurality of Tx antennas, with the intentions of achieving a lower error rate.

Vahid Tarokh et. al. proposed space-time block coding (STBC) as one of methods of efficiently applying antenna diversity (see "Space-Time Block Coding from Orthogonal Designs", IEEE Trans. On Info., Theory, Vol. 45, pp. 1456-1467, July 1999). The Tarokh STBC scheme is an extension of the transmit antenna diversity scheme of S. M. Alamouti (see, "A Simple Transmit Diversity Technique for Wireless Communications", IEEE Journal on Selected Area in Communications, Vol. 16, pp. 1451-1458, October 1988), for two or more Tx antennas.

Figure 1:
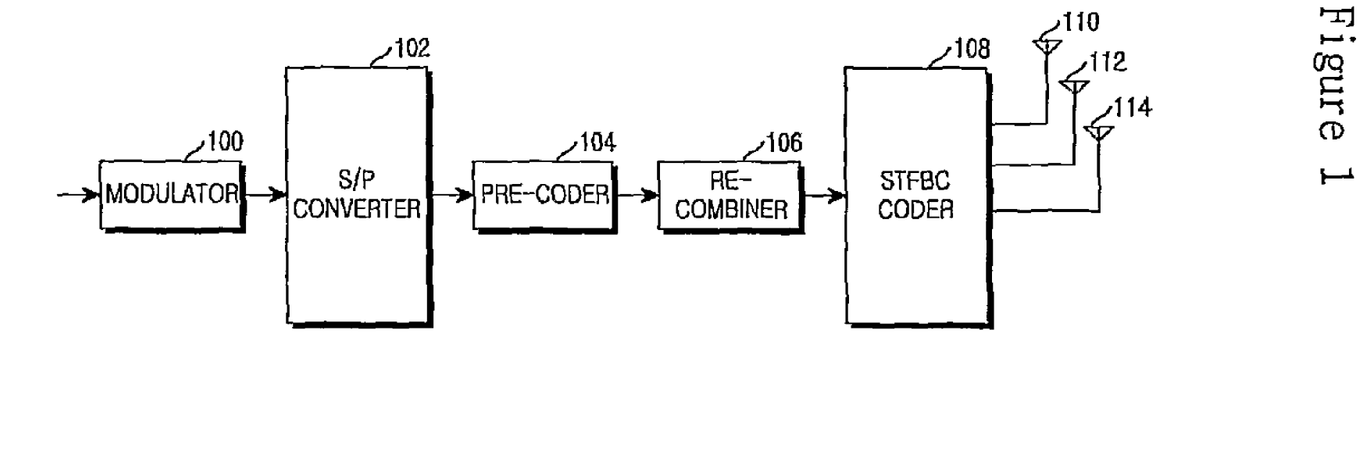
FIG. 1 is a block diagram of a transmitter in a mobile communication system using a STFBC scheme.

A STFBC scheme is proposed as another method of efficiently applying the antenna diversity scheme. FIG. 1 is a block diagram of a transmitter in a mobile communication system using such STFBC scheme. As illustrated FIG. 1, a transmitter includes a modulator 100, a serial-to-parallel (S/P) converter 102, an STBC coder (Encoder) 108, and three Tx antennas 106.

Referring to FIG. 1, a transmission scheme of the transmitter is described as follows. A modulator 100 modulates input information data (or coded data) in a predetermined modulation scheme. The modulation scheme can be one of binary phase shift keying (BPSK), quadrature phase shift keying (QPSK), quadrature amplitude modulation (QAM), pulse amplitude modulation (PAM), and phase shift keying (PSK).

The S/P converter 102 parallelizes serial modulation symbols received from the modulator 100, $s_1$, $s_2$, $s_3$, $s_4$. The SFTBC coder 108 encodes four data from the S/P converter 102 using a scheme defined by Equation (1), in order to achieve full diversity.

$$s_i = x_i e^{j\theta} \qquad (1)$$

where $1 \leq i \leq 4$, $X_i$ is a modulated symbol value, $S_i$ is a value rotated by $\ominus$. A re-combiner 106 receives the pre-coded symbol $S_i$ and groups the real and imaginary parts of the pre-coded symbol sequence by twos in an interleaving scheme, thereby generating symbol vectors. That is, the re-combiner recombines input pre-coded symbols, thereby generating $\tilde{s}_i$ as Equation (2).

$$\tilde{s}_1 = s_{1I} + js_{3Q}; \tilde{s}_2 = s_{2I} + js_{4Q}; \tilde{s}_3 = s_{3I} + js_{1Q}; \tilde{s}_4 = s_{4I} + js_{2Q};$$
$$\tilde{s}_5 = s_{5I} + js_{7Q} \text{ where } s_i = s_{iI} + js_{iQ}. \qquad (2)$$

where I represents real part, Q represents imaginary part, and j represents complex number.

The four recombined symbols are STFBC coded and transmitted through the three transmit antennas. A coding matrix used to generate the combinations is expressed as shown in Equation (3).

$$A = \begin{bmatrix} \tilde{s}_1 & -\tilde{s}_2^* & 0 & 0 \\ \tilde{s}_2 & \tilde{s}_1^* & \tilde{s}_3 & -\tilde{s}_4^* \\ 0 & 0 & \tilde{s}_4 & -\tilde{s}_3^* \end{bmatrix} \qquad (3)$$

where, $\tilde{s}_1 \sim \tilde{s}_4$ are symbols passed through the pre-coder 104 and the re-combiner 106. The present method was proposed by Indian Sundar Rajan professor group. However, as Equation (1), it is obvious not to only for configuring STFBC coder. Equation (3) is used to arrange properly for grouping four input data by twos using Alamouti scheme and enabling STFBC coder configured by the Alamouti scheme with the two transmit antennas to transmit them through three antennas.

The Alamouti scheme for the two transmit antennas can be configured using one of matrixes of Equation (4) for two input symbols $S_1$ and $S_2$.

$$A_1 = \begin{bmatrix} s_1 & s_2^* \\ s_2 & -s_1^* \end{bmatrix}, A_2 = \begin{bmatrix} s_1 & s_2^* \\ s_2 & -s_1^* \end{bmatrix}, \qquad (4)$$
$$A_3 = \begin{bmatrix} s_1 & -s_2^* \\ s_2 & s_1^* \end{bmatrix}, A_4 = \begin{bmatrix} -s_1 & s_2^* \\ s_2 & s_1^* \end{bmatrix}$$

In the coding matrix as Equation (3), the number of rows corresponds to the number of transmit antennas and the number of columns represents time and frequency being needed to transmit three symbols. Here, first two columns are transmitted to frequency, f1, the other two columns are transmitted to frequency, f2. The front one of the two columns being transmitted through f1 is transmitted for a first time interval, t1, the rear column is transmitted for a second time interval, t2. Thus, four symbols are transmitted through three antennas for two time and frequency intervals.

As such context, data of the first two columns may be transmitted for t1, the other two columns, for t2. The front one of data of two columns being transmitted for t1 is transmitted for f1, and the rear data, for f2. That is, the first, second, third and fourth column data are transmitted for f1 and t1, f1 and t2, f2 and t1, and f2 and t2, respectively.

However, as described above, it is obvious not to be required to limit to use both time and frequency when signals are transmitted.

The each element for four columns uses the same frequency and can be transmitted having different time interval each other. That is, the first, second, third and fourth column data are transmitted for t1, t2, t3, and t4, respectively.

Also, all elements can be transmitted for the same time interval with different frequency region each other. That is, the first, second, third and fourth column data are transmitted for f1, f2, f3, and f4, respectively.

As described above, the STFBC coder 108 generates four symbol sequences using the input four symbols, their conjugates and negatives, and transmits them through the three antennas 110, 112, 114 for two time and frequency intervals. That is, the first, second, and third rows of space-time frequency block code configured in the STFBC coder 108 are transmitted through the first, second and third antennas 110 to 114, respectively. Because the symbol sequences for the respective antennas, that is, the columns of the coding matrix, are mutually orthogonal, as high a diversity gain as a diversity order is achieved.

As described above, the Alamouti STFBC technique offers the benefit of achieving as high a diversity order as the number of Tx antennas, namely a full diversity order, without sacrificing data rate by transmitting complex symbols through only two Tx antennas.

Figure 2:
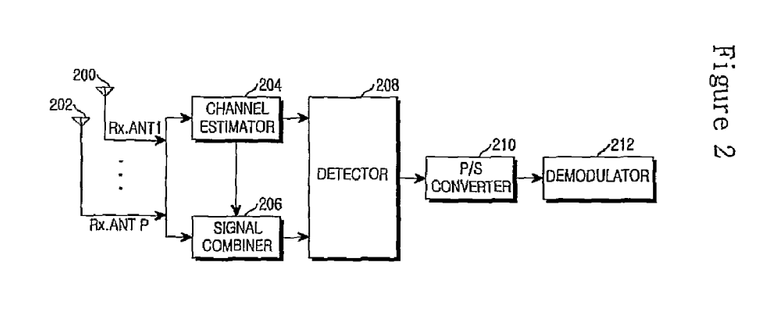
FIG. 2 is a block diagram of a receiver in a mobile communication system using a STFBC scheme.

FIG. 2 is a block diagram of a receiver in the mobile communication system using the STFBC scheme. In particular, the receiver in FIG. 2 is the counterpart of the transmitter illustrated in FIG. 1.

As described above, the receiver includes a plurality of Rx antennas 200 to 202, a channel estimator 204, a signal combiner 206, a detector 208, a parallel-to-serial (P/S) converter 210, and a demodulator 212.

Referring to FIG. 2, the first to $P^{th}$ Rx antennas 200 to 202 provide signals received from the three antennas of the transmitter illustrated in FIG. 1 to channel estimator 204 and the signal combiner 206. The channel estimator 204 estimates channel coefficients representing channel gains from the Tx antennas 106 to 112 to the Rx antennas 200 to 202 using the signals received from to $P^{th}$ Rx antennas 200 to 202.

The signal combiner 206 combines the signals received from the $P^{th}$ Rx antennas 200 to 202 with the channel coefficients from the channel estimator 204 in a predetermined method.

The detector 208 generates hypothesis symbols by multiplying the combined symbols by the channel coefficients, calculates decision statistics for all possible transmitted symbols from the transmitter using the hypothesis symbols, and detects the actual transmitted symbols through threshold detection.

The P/S converter 210 serializes the parallel symbols received from the detector 208, and the demodulator 212 demodulates the serial symbol sequence in a predetermined demodulation scheme, thereby recovering the original information bits.

In this manner, the use of STFBC encoding four symbols using Alamouti scheme with three antennas by Equation (3) enables linear decoding at the receiver, thereby decreasing decoding complexity. Here, Sundar Rajan group uses a fixed phase rotation angle $\ominus$, regardless of modulation scheme. That is, $\ominus=(\frac{1}{2})$atan 2 is used regardless of QPSK and 16QAM modulation scheme.

Now to describe that the coding gain of the Sundar Rajan group's STBFC can be further improved, a design of a space-time frequency block code will be described below.

Two designs of a space-time trellis code were proposed in a paper by Tarokh in 1997. Before explaining the design rule, an error probability bound of the space-time trellis code is as follows.

$$p(c \to e) \le \left(\prod_{n=1}^{r} \lambda_n \right)^{-M} \left(\frac{E_s}{4N_0}\right)^{-rM} \quad (5)$$

Equation (5) is an equation representing pairwise error probability of the space-time trellis code. In Equation (5), r donates a rank of a c–>e matrix, M denotes the number of Rx antennas, and λ denotes a diagonal term of the c–>e matrix. $E_s$ denotes symbol energy and $N_0$ denotes noise. In a right-hand side of Equation (5), a first term is a determinant criterion representing a coding gain or coding advantage and a second term is a rank criterion representing a diversity gain.

1) Determinant Criterion: It is a design condition for maximizing coding gain and the product of $\lambda_1 \ldots, \lambda_r$ should be designed to have the largest code in order to obtain the large coding gain.

2) Rank Criterion: It is a design condition for maximizing diversity gain and should be designed to have a full rank.

Regarding the coding gain, the Sundar Rajan group calculated $\ominus$ by applying the design rule 1) to the space-time block coding. This method is achieved by maximizing a minimum value among the products of Eigen values (not zero) of N*M matrices A(c, e) corresponding to this a difference (c–e) between two different signal vectors. If calculating $\ominus$ by this method, $\ominus$ is equal to about 59°.

Figure 4:
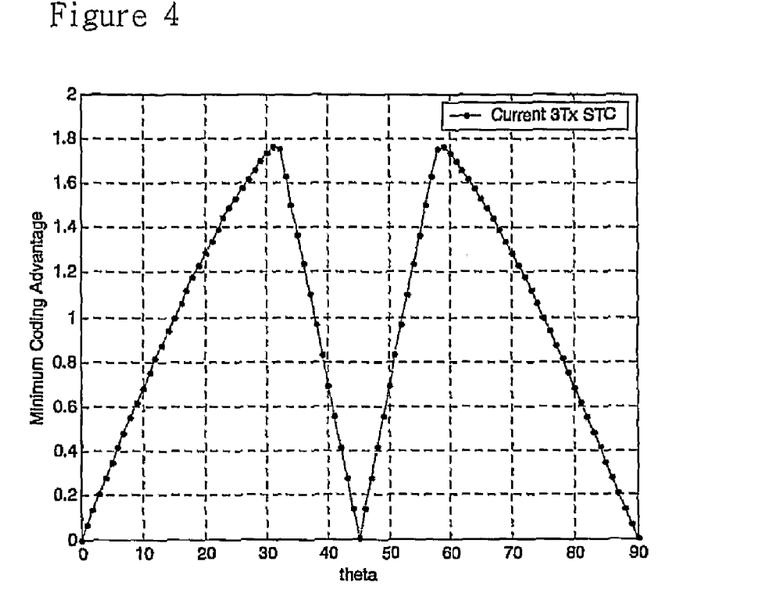
FIG. 4 is a graph illustrating coding gain based on a conventional code design proposed by Tarokh.

FIG. 4 is a graph of a minimum coding gain obtained by the conventional design rule proposed by Tarokh while changing $\ominus$ from 0 to 90. As illustrated in FIG. 4, it can be seen that the minimum coding gain is greatest at a phase of 59°.

In an actual simulation, however, the use of this value degrades the system performance. For example, if a phase rotation angel $\ominus$ is calculated using the Tarokh's design rule, the phase rotation angle $\ominus$ is 59°. In this case, the minimum coding gain is 1.7659 and happens 2048 times when QPSK is assumed. The second smallest coding gain is 1.8779 and happens 1024 times. The third smallest coding gain is 3.5318 and happens 3072 times. The fourth smallest coding gain is 3.7558 and happens 768 times. If 63.43° is assumed, however, the minimum coding gain is 1.6002 and happens 2048 times. The second smallest coding gain is 2.3994 and happens 1024 times. The third smallest coding gain is 3.2001 and happens 3072 times. The fourth smallest coding gain is 4.000 and happens 3072 times. According to the design rule, compared with the two cases, the performance must be better in the use of 59° at which the coding gain is good. However, the performance is better in the use of 63.43

Accordingly, the design rule 1) is not perfect. That is, there is a need for a method of further improving the coding gain at the Sudar Rajan group's transmitter.

DISCLOSURE

Technical Problem

An object of the present invention is to provide a transmitter and a transmission method for improving coding gain in a mobile communication system with three antennas.

Another object of the present invention is to provide a transmitter and a transmission method for providing phase rotator maximizing coding gain in a mobile communication system using three antennas, wherein vector symbols are rotated on a complex plane and the real and imaginary parts of the resulting new symbols $x_i+jy_i$ are reconstructed, prior to transmission.

Technical Solution

According to one aspect of the present invention, in a transmitter with three transmit antennas in a system using a space-time block coding scheme, a pre-coder pre-codes an input symbol sequence by multiplying the input symbol sequence by $e^{j\Theta}$, {$\Theta$ being a phase rotation angle in range of $0 \leq \Theta \leq pi/2$, in case of QPSK, atan(⅓), or pi/2-atan(⅓), in case of 16QAM, atan(²/₇) or pi/2-atan(²/₇), and in case of 64QAM, atan(⅛) or pi/2-atan(⅛)}, the pre-coded symbol sequence being reconstructed to have real and imaginary parts. A re-combiner generates symbol vectors by grouping the real and imaginary parts of the pre-coded symbol sequence by twos in an interleaving scheme. A STFBC coder encodes the recombined symbol vectors in an Alamouti scheme and transmits the encoded symbol vectors through corresponding transmit antennas.

Also, when $\Theta$ is not changed according to a modulation scheme, $\Theta$ is fixed to atan(⅓) or pi/2-atan(⅓) in range of $0 \leq \Theta \leq pi/2$.

When the above pre-coder pre-codes, in range of pi/2<$\Theta$, $\Theta$ is in case of QPSK, atan(⅓)+n*pi/2 or pi/2-atan(⅓)+n*pi/2, in case of 16QAM, atan(²/₇)+n*pi/2 or pi/2-atan(²/₇)+n*pi/2, and in case of 64QAM atan(⅛)+n*pi/2 or pi/2-atan(⅛)+n*pi/2. Here, n is an integer.

Also, when $\Theta$ is not changed according to the modulation method, $\Theta$ is fixed to atan(⅓)+n*pi/2 or pi/2-atan(⅓)+n*pi/2 in range of pi/2<$\Theta$.

In addition, other embodiments enable to achieve the object of the present invention without departing from the scope of the present invention.

Advantageous Effects

In an apparatus and method of STBC in transmitter using three Tx antennas, the phase rotation angle $\Theta$ calculated by $$\underset{\theta}{\arg\max} \operatorname{mean}(C.A.)$$

over all possible is used, and the input symbol sequence is transmitted through a plurality of Tx antennas according to a predetermined method, thereby maximizing coding gain of the space-time frequency block coding.

DESCRIPTION OF DRAWINGS

FIG. 6 is a graph illustrating BER performance calculated while changing phase rotator.

BEST MODE

Preferred embodiments of the present invention will be described in detail herein below with reference to the accompanying drawings. In the following description, well-known functions or constructions are not described in detail since they would obscure the invention in unnecessary detail.

The present invention proposes a method of maximizing coding gain of a space-time frequency block coding in a transmitter having three antennas in a communication system, wherein an input symbol sequence is transmitted through a plurality of Tx antennas in a predetermined method. And the present invention proposes a transmitter and a transmission method based on the predetermined method.

The configuration of the present invention is the same as that of FIG. 1 in appearance. However, a pre-coder 104 in FIG. 1 in the present invention produces the new symbols $x_i+jy_i$ by multiplying symbols vector ($\Theta$ being a phase rotation angle on a complex plane) by $e^{j\Theta}$, using a value calculated by other method to the space-time block coding instead of a value calculated using the design rule proposed by Tarokh, thereby obtaining improved coding gain.

The present configuration is as following description. That is, a modulator 100 modulates input information data and transmits them P/S converter 102 in the FIG. 1. The four modulated signals are transmitted to a pre-coder 104 in the FIG. 1. The pre-coder 104 pre-codes symbol vectors of input symbol sequence by multiplying them by $e^{j\Theta}$, {$\Theta$ being a phase rotation angle in range of $0 \leq \Theta \leq pi/2$, in case of QPSK, atan(⅓), or pi/2-atan(⅓), in case of 16QAM, atan(²/₇) or pi/2-atan(²/₇), and in case of 64QAM, atan(⅛) or pi/2-atan(⅛)}, the pre-coded symbol sequence being reconstructed to have real and imaginary parts. Then, when $\Theta$ is not changed according to the modulation scheme, the most efficient scheme is to apply that $\Theta$ is atan(⅓) or pi/2-atan(⅓) in all modulation scheme. A re-combiner generates symbol vectors by grouping the real and imaginary parts of the pre-coded symbol sequence by twos in an interleaving scheme. A STFBC coder encodes the symbol vectors in an Alamouti scheme and transmits the encoded symbol vectors through corresponding transmit antennas. The present invention comprises a transmitter using three Tx antennas including such STFBC coder.

In range of pi/2<$\Theta$ in case of QPSK, atan(⅓)+n*pi/2 or pi/2-atan(⅓)+n*pi/2, in case of 16QAM, atan(¼)+n*pi/2 or pi/2-atan(¼)+n*pi/2, and in case of 64QAM, atan(¹/₁₈)+n*pi/2 or pi/2-atan(¹/₁₈)+n*pi/2. Here, n is an integer.

When $\Theta$ is not changed according to the modulation scheme, the most efficient scheme is to apply that $\Theta$ is atan(⅓)+n*pi/2 or pi/2-atan(⅓)+n*pi/2 for all modulation schemes.

Figure 3:
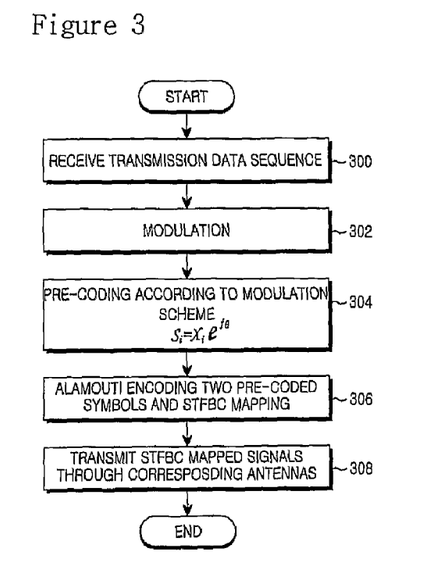
FIG. 3 is a block diagram of a transmit procedure of a transmitter in a mobile communication system using a STFBC scheme being proposed in present invention.

Referring FIG. 3, now a method of the present invention will be described in detail. FIG. 3 is a block diagram illustrating a transmit procedure of a transmitter in the mobile communication system using the STFBC scheme being proposed by the present invention. Hereinafter, the present invention is described referring the block diagram of the FIG. 3.

Information data is received in step 300 and modulated in a predetermined method in step 302. As stated above, a modulation method can be used as one of BPSK, QPSK, PAM, and QAM. The modulated signals are pre-coded according the modulation method in step 304, as stated above. That is, if an input data is $X_i$, $S_i$ is calculated by multiplying $X_i$ by $e^{j\Theta}$, $\Theta$ being a phase rotation angle in range of $0 \leq \Theta \leq pi/2$, in case of QPSK, atan(⅓), or pi/2-atan(⅓), in case of 16QAM, atan(2/7) or pi/2-atan(2/7), and in case of 64QAM, atan(⅛) or pi/2-atan (⅛). In range of pi/2<$\Theta$, $\Theta$ is in case of QPSK, atan(⅓)+n*pi/2 or pi/2-atan(⅓)+n*pi/2, in case of 16QAM, atan(2/7)+n*pi/2 or pi/2-atan(2/7)+n*pi/2, and in case of 64QAM, atan(⅛)+n*pi/2 or pi/2-atan(⅛)+n*pi/2. Here, n is an integer. When 0 is not changed according to each modulation scheme, $\Theta$ is atan(⅓), pi/2-atan(⅓), atan(⅓)+n*pi/2 or pi/2-atan(⅓)+n*pi/2, respectively. Here, n is an integer. The symbol vectors are generated by grouping the real and imaginary parts of the pre-coded symbol sequence by twos in an interleaving scheme.

That is, the symbol vectors are recombined as $$\tilde{s}_1 = s_{1I} + js_{3Q}; \tilde{s}_2 = s_{2I} + js_{4Q}; \tilde{s}_3 = s_{3I} + js_{1Q}; \tilde{s}_4 = s_{4I} + js_{2Q};$$
$$\tilde{s}_5 = s_{5I} + js_{7Q} \text{ where } s_i = s_{iI} + js_{iQ}.$$

The recombined symbols are Alamouti STFBC coded by twos and are STFBC mapped for three antennas as Equation (3) (Step 306). The STFBC mapped signals are transmitted through the allocated antennas (Step 308).

When the symbols are STBC coded by the above method, the value of $\Theta$ is changed according to the modulation method in modulator prior to STBC coder. Method of acquiring changed value of $\Theta$ can be provided in the following description.

That is, coding gains of all possible cases are calculated and the number of their occurrences is checked. Thereafter, a mean coding gain is calculated. The phase rotation angle $\Theta$ having the largest mean coding gain is calculated using Equation (6) below. Using Equation (6), the improvement of the coding gain can be seen. In Equation (6), (C.A.) represents a coding advantage or coding gain.

$$\underset{\theta}{\operatorname{argmax}} \operatorname{mean}(C.A.) \quad (6)$$

The actual calculation method is performed as follows.

That is, when the phase rotation angle $\Theta$ is calculated using Equation (7) below, in range of $0 \leq \Theta \leq pi/2$, in case of QPSK, atan(⅓), or pi/2-atan(⅓), in case of 16QAM, atan(2/7) or pi/2-atan(2/7), and in case of 64QAM, atan(⅛) or pi/2-atan (⅛).

In range of pi/2<$\Theta$, $\Theta$ is in case of QPSK, atan(⅓)+n*pi/2 or pi/2-atan(⅓)+n*pi/2, in case of 16QAM, atan(2/7)+n*pi/2 or pi/2-atan(2/7)+n*pi/2, and in case of 64QAM, atan(⅛)+n*pi/2 or pi/2-atan(⅛)+n*pi/2. Here, n represent integers.

If the same value of $\Theta$ for all modulation schemes is used in order to reduce system complexity, it is most efficient in range of $0 \leq \Theta \leq pi/2$, atan(⅓) or pi/2-atan(⅓) and in range of pi/2<$\Theta$, atan(⅓)+n*pi/2 or pi/2-atan(⅓)+n*pi/2. Here, n is an integer.

$$\underset{\theta}{\operatorname{argmax}} \operatorname{mean}(C.A.) \text{ over all possible } \theta \quad (7)$$

These values are different from $\Theta = (½)*\operatorname{atan}(2)$ proposed by Sundar Rajan.

Figure 5:
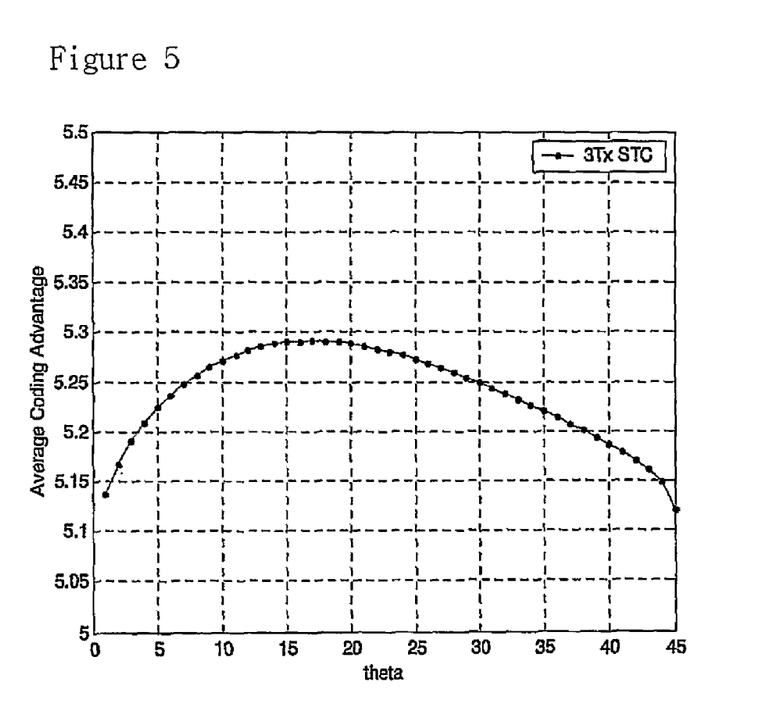
FIG. 5 is a graph illustrating coding gain based on a design according to the present invention.

FIG. 5 is a graph illustrating coding gain based on a design according to the present invention. That is, FIG. 5 is a graph illustrating average coding gain calculated by the above Equation (7). As shown in FIG. 5, the values are different from values calculated using the Tarokh's design rule.

As shown from FIG. 5, the method according to the present invention has the best performance in the case of atan(⅓).

Figure 6:
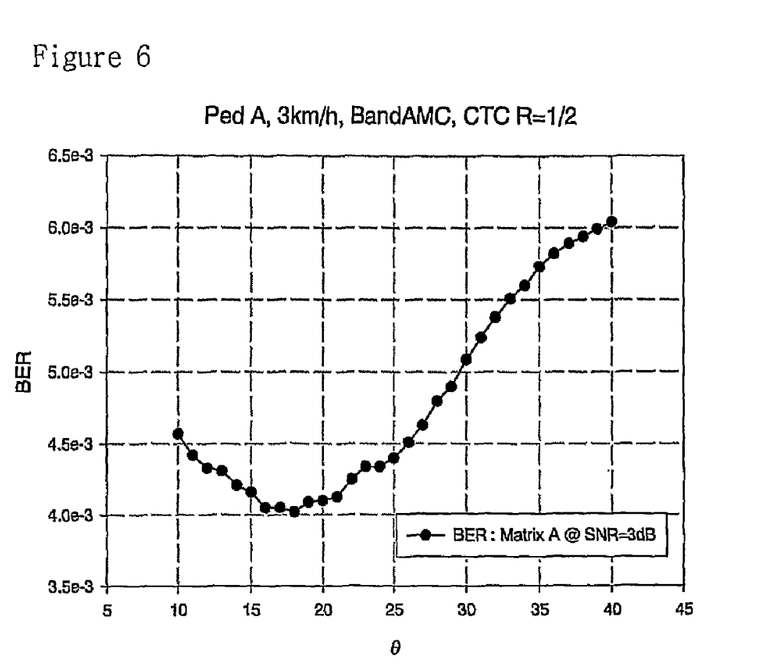

FIG. 6 is a BER performance graph obtained while phase rotator is changed. It illustrates coded BER performance obtained while changing the phase rotator $\Theta$ using system environment based on IEEE 802.16. As shown in FIG. 6, the present invention has the best performance in the case of about atan(⅓). This is consistent with the result in FIG. 5.

Figure 7:
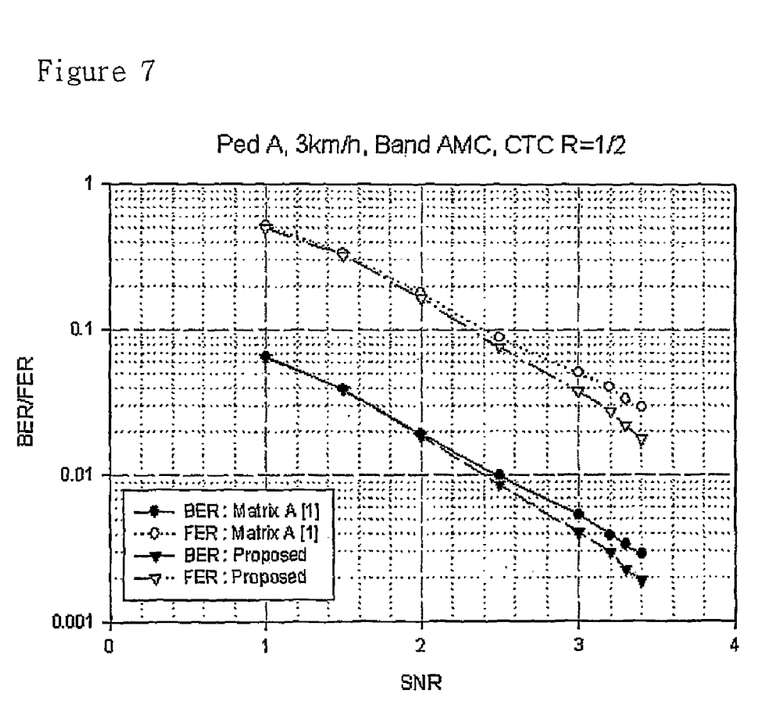
FIG. 7 is a graph illustrating performance comparison between the conventional code design by proposed by Tarokh and the code design by the present invention.

FIG. 7 is a graph illustrating performance comparison between the conventional code design proposed by Tarokh and the code design by the present invention. FIG. 7 is a graph illustrating performance comparison between the case of (½) atan(2) calculated by Sundar Rajan's group using the design rule by Tarokh and the case of atan(⅓) calculated by the present invention. It is found that the present invention has greater performance. Simulation is performed in the system environment based on IEEE 802.16. A mobile terminal moves at 3 km/h in Pedestrian A channel, and QPSK and channel coding having a convolutional Turbo code (½ code rate) is in the simulation. IEEE 802.16 standard has both band AMC and FUSC as a sub channel structure, and here band AMC is used.

The invention claimed is:

1. A transmitter in a communication system using three transmit antennas, comprising:
   a pre-coder for pre-coding an input symbol sequence by multiplying the input symbol sequence by $e^{j\theta}$, the pre-coded symbol sequence having real and imaginary parts;
   a re-combiner for generating symbol vectors by grouping the real and imaginary parts of the pre-coded symbol sequence by twos in interleaving scheme; and
   one of a Space-Time frequency Block Code (STFBC) or Space-Time Block Code (STBC) coder for transmitting the each recombined symbol vectors through corresponding antennas by Alamouti coding,
   wherein $\theta$ is a phase rotation angle in a range of $0 \leq \theta pi|2$, and
   wherein, in the case of Quadrature Phase Shift Keying (QPSK), $\theta$ is one of atan(⅓) or pi/2-atan(⅓), in the case of 16 Quadrature Amplitude Modulation (QAM), $\theta$ is one of atan(¼) or pi/2-atan(¼), and in the case of 64QAM, $\theta$ is one of atan(1/18) or pi/2-atan(1/18).

2. The transmitter in the communication system using three transmit antennas in claim 1, wherein a matrix of symbol vectors through the STFBC coder is expressed as:

$$A = \begin{bmatrix} \tilde{s}_1 & -\tilde{s}_2^* & 0 & 0 \\ \tilde{s}_2 & \tilde{s}_1^* & \tilde{s}_3 & -\tilde{s}_4^* \\ 0 & 0 & \tilde{s}_4 & -s_3^* \end{bmatrix}.$$

3. A transmitter in a communication system using three transmit antennas, comprising:
   a pre-coder for pre-coding an input symbol sequence by multiplying the input symbol sequence by $e^{j\theta}$, the pre-coded symbol sequence having real and imaginary parts;
   a re-combiner for generating symbol vectors by grouping the real and imaginary parts of the pre-coded symbol sequence by twos in interleaving scheme; and
   one of a Space-Time frequency Block Code (STFBC) or Space-Time Block Code (STBC) coder for transmitting the each recombined symbol vectors through corresponding antennas by Alamouti coding, wherein θ is a phase rotation angle in a range of pi/2<θ, and wherein, in the case of Quadrature Phase Shift Keying (QPSK), θ is one of atan(⅓)+n*pi/2 or pi/2-atan(⅓)+n*pi/2, in the case of 16 Quadrature Amplitude Modulation (QAM), θ is one of atan(2/7)+n*pi/2 or pi/2-atan(2/7)+n*pi/2, and in the case of 64QAM, θ is one of atan(⅛)+n*pi/2 or pi/2-atan(⅛)+n*pi/2.

4. The transmitter in the communication system using three transmit antennas in claim 3, wherein a matrix of symbol vectors through the mapper is expressed as:

$$A = \begin{bmatrix} \tilde{s}_1 & -\tilde{s}_2^* & 0 & 0 \\ \tilde{s}_2 & \tilde{s}_1^* & \tilde{s}_3 & -\tilde{s}_4^* \\ 0 & 0 & \tilde{s}_4 & -\tilde{s}_3^* \end{bmatrix}.$$

5. A transmission method in a communication system using three transmit antennas that includes Space-Time Block Coding (STBC) or Space-Time frequency Block Coding (STFBC), comprising the steps of:

pre-coding an input symbol sequence by multiplying the input symbol sequence by $e^{j\theta}$, the pre-coded symbol sequence having real and imaginary parts;

generating symbol vectors by grouping the real and imaginary parts of the pre-coded symbol sequence by twos in interleaving scheme; and transmitting the each recombined symbol vectors through corresponding antennas by Alamouti coding, wherein θ is a phase rotation angle in a range of 0≦θ≦pi/2 and wherein in the case of Quadrature Phase Shift Keying (QPSK), θ is one of atan(⅓) or pi/2-atan(⅓), in the case of 16 Quadrature Amplitude Modulation (QAM), θ is one of atan(¼) or pi/2-atan(¼), and in the case of 64QAM, θ is one of atan(1/18) or pi/2-atan(1/18).

6. A transmission method in a communication system using three transmit antennas that includes Space-Time Block Coding (STBC) or Space-Time frequency Block Coding (STFBC), comprising the steps of:

pre-coding an input symbol sequence by multiplying the input symbol sequence by $e^{j\theta}$, the pre-coded symbol sequence having real and imaginary parts;

generating symbol vectors by grouping the real and imaginary parts of the pre-coded symbol sequence by twos in interleaving scheme; and transmitting through the each recombined symbol vectors corresponding antennas by Alamouti coding, wherein θ is a phase rotation angle in a range of pi/2<θ and wherein, in the case of Quadrature Phase Shift Keying (QPSK), θ is one of atan(⅓)+n*pi/2 or pi/2-atan(⅓)+n*pi/2, in the case of 16 Quadrature Amplitude Modulation (QAM), θ is one of atan(2/7)+n*pi/2 or pi/2-atan(2/7)+n*pi/2, and in the case of 64QAM, θ is one of atan(⅛)+n*pi/2 or pi/2-atan(⅛)+n*pi/2.

7. A transmitter in a communication system using three transmit antennas, comprising:

a pre-coder for pre-coding an input symbol sequence by multiplying the input symbol sequence by $e^{j\theta}$, the pre-coded symbol sequence having real and imaginary parts;

re-combiner for generating symbol vectors by grouping the real and imaginary parts of the pre-coded symbol sequence by twos in interleaving scheme; and one of a Space-Time frequency Block Code (STFBC) or Space-Time Block Code (STBC) coder for transmitting the each recombined symbol vectors through corresponding antennas by Alamouti coding, wherein θ is a phase rotation angle in a range of 0≦θ≦pi/2, and wherein in all modulation schemes of Quadrature Phase Shift Keying (QPSK), 16 Quadrature Amplitude Modulation (QAM) and 64QAM, θ is one of atan(⅓) or pi/2-atan(⅓).

8. The transmitter in the communication system using three transmit antennas in claim 7, wherein a matrix of symbol vectors through the STFBC coder is expressed as:

$$A = \begin{bmatrix} \tilde{s}_1 & -\tilde{s}_2^* & 0 & 0 \\ \tilde{s}_2 & \tilde{s}_1^* & \tilde{s}_3 & -\tilde{s}_4^* \\ 0 & 0 & \tilde{s}_4 & -\tilde{s}_3^* \end{bmatrix}.$$

9. A transmitter in a communication system using three transmit antennas, comprising:

a pre-coder for pre-coding an input symbol sequence by multiplying the input symbol sequence by $e^{j\theta}$, the pre-coded symbol sequence having real and imaginary parts;

a re-combiner for generating symbol vectors by grouping the real and imaginary parts of the pre-coded symbol sequence by twos in interleaving scheme; and one of a Space-Time frequency Block Code (STFBC) or Space-Time Block Code (STBC) coder for transmitting through the each recombined symbol vectors corresponding antennas by Alamouti coding, wherein θ is a phase rotation angle in a range of pi/2<θ, and wherein in all modulation schemes of Quadrature Phase Shift Keying (QPSK), 16 Quadrature Amplitude Modulation (QAM) and 64QAM, θ is one of atan(⅓)+n*pi/2 or pi/2-atan (⅓)+n*pi/2.

10. The transmitter in the communication system using three transmit antennas in claim 9, wherein a matrix of symbol vectors through the STFBC coder is expressed as:

$$A = \begin{bmatrix} \tilde{s}_1 & -\tilde{s}_2^* & 0 & 0 \\ \tilde{s}_2 & \tilde{s}_1^* & \tilde{s}_3 & -\tilde{s}_4^* \\ 0 & 0 & \tilde{s}_4 & -\tilde{s}_3^* \end{bmatrix}.$$

11. A transmission method in a communication system using three transmit antennas that includes Space-Time Block Coding (STBC) or Space-Time frequency Block Coding (STFBC), comprising the steps of:

pre-coding an input symbol sequence by multiplying the input symbol sequence by $e^{j\theta}$, the pre-coded symbol sequence having real and imaginary parts;

generating symbol vectors by grouping the real and imaginary parts of the pre-coded symbol sequence by twos in interleaving scheme; and transmitting through corresponding antennas by Alamouti coding the each recombined symbol vectors, wherein θ is a phase rotation angle in a range of 0≦θ≦pi/2, and wherein in all modulation schemes of Quadrature Phase Shift Keying (QPSK), 16 Quadrature Amplitude Modulation (QAM), and 64QAM, θ is one of atan(⅓) or pi/2-atan(⅓).

12. A transmission method in a communication system using three transmit antennas that includes Space-Time Block Coding (STBC) or Space-Time frequency Block Coding (STFBC), comprising the steps of:

pre-coding an input symbol sequence by multiplying the input symbol sequence by $e^{j\theta}$, the pre-coded symbol sequence having real and imaginary parts;

generating symbol vectors by grouping the real and imaginary parts of the pre-coded symbol sequence by twos in interleaving scheme; and transmitting the each recombined symbol vectors through corresponding antennas by Alamouti coding, wherein $\theta$ is a phase rotation angle in a range of $pi/2<\theta$, and wherein in all modulation schemes of Quadrature Phase Shift Keying (QPSK), 16 Quadrature Amplitude Modulation (QAM) and 64QAM, $\theta$ is one of $atan(1/3)+n*pi/2$ or $pi/2-atan(1/3)+n*pi/2$.

* * * * *